(12) United States Patent
Lee

(10) Patent No.: US 7,154,448 B2
(45) Date of Patent: Dec. 26, 2006

(54) ANTENNA MODULE

(75) Inventor: Jae-Ho Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 11/146,100

(22) Filed: Jun. 7, 2005

(65) Prior Publication Data

US 2005/0280597 A1    Dec. 22, 2005

(30) Foreign Application Priority Data

Jun. 19, 2004    (KR) .................. 10-2004-0045890

(51) Int. Cl.
*H01Q 21/00* (2006.01)
(52) U.S. Cl. ..................... 343/853; 343/860
(58) Field of Classification Search ................ 343/850, 343/853, 860; 455/114.1
See application file for complete search history.

(56) References Cited

U.S. PATENT DOCUMENTS 2,051,503 A * 8/1936 Usselman ................. 455/114.1

2001/0054981 A1    12/2001    Boyle

FOREIGN PATENT DOCUMENTS

| EP | 1 193 797 A2 | 4/2002 |
|---|---|---|
| EP | 1 311 063 A2 | 5/2003 |
| EP | 1 193 797 A3 | 9/2004 |
| EP | 1 311 063 A3 | 3/2005 |

* cited by examiner

*Primary Examiner*—Hoang V. Nguyen
(74) *Attorney, Agent, or Firm*—Roylance, Abrams, Berdo & Goodman, L.L.P.

(57)    ABSTRACT

An antenna module having at least one reception antenna for converting electromagnetic waves to electrical signals, at least one transmission antenna for converting electrical signals to electromagnetic waves, at least one first coil for adjusting the electrical signals received through the reception antenna, at least one second coil for adjusting the electrical signals transmitted to the transmission antenna, at least one third coil for adjusting a magnitude of impedance for grounding, and one feed point for both transmitting the electrical signals received from the reception antenna to a receiver, and for transmitting electrical signals transmitted from a transmitter to the transmission antenna.

8 Claims, 3 Drawing Sheets

ANTENNA MODULE

CROSS-REFERENCE TO RELATED APPLICATIONS

This application claims the benefit under 35 U.S.C. §119 (a) of Korean Patent Application No. 10-2004-0045890 entitled "Antenna Module" filed in the Korean Intellectual Property Office on Jun. 19, 2004, the entire contents of which are incorporated herein by reference.

BACKGROUND OF THE INVENTION

1. Field of the Invention

The present invention relates to an antenna. More particularly, the present invention relates to an antenna module having one feed point for both a transmission antenna and a reception antenna which are separated from each other.

2. Description of the Related Art

A general portable terminal uses a method of simultaneously performing transmission/reception through one antenna. This method is achieved by separately performing the transmission/reception of signals by the use of a duplexer. However, in the portable terminal that is simultaneously performing transmission/reception through a single antenna as described above, interference occurs between transmission and reception. Therefore, the performance of the portable terminal deteriorates and the duplexer must be used for separating transmission signals and reception signals. The performance of the single antenna portable terminal deteriorates if the duplexer is not provided, however, it is difficult to miniaturize the portable terminal due to the size of the duplexer.

In order to solve these problems, a portable terminal may have separate transmission/reception antennas without the duplexer. These separate transmission/reception antennas without the duplexer have two feed points through which signals received through a reception antenna are transmitted to a receiver, and through which signals transmitted from a transmitter are transmitted to a transmission antenna, respectively.

If the separate transmission/reception antennas are further incorporated into a single module, the separate transmission/reception antennas may be more easily mounted on a portable terminal. Further, an antenna having a wider bandwidth would have an improved transmission/reception performance.

Accordingly, a need exists for a system and method for incorporating a separate transmission and reception antenna on a portable terminal, and which further provide improved transmission/reception performance.

SUMMARY OF THE INVENTION

Accordingly, the present invention has been made to solve the above-mentioned and other problems occurring in the prior art, and it is an object of the present invention to provide an antenna module having one feed point for both a transmission antenna and a reception antenna which are separated from each other.

It is another object of the present invention to provide an antenna module which can be easily installed.

It is further another object of the present invention to provide an antenna module having a wider bandwidth.

In accordance with one aspect of the present invention, there is provided an antenna module comprising at least two antennas for transmitting/receiving signals, respectively, at least three coils for adjusting impedance of signals transmitted from/received in the antennas and impedance for grounding, and one feed point for transmitting the signals transmitted from/received in the antennas to a transceiver.

In accordance with another aspect of the present invention, an antenna module is provided comprising at least one reception antenna for converting electromagnetic waves to electrical signals, at least one transmission antenna for converting electrical signals to electromagnetic waves, at least one first coil with a predetermined magnitude of impedance for adjusting the electrical signals received through the reception antenna, at least one second coil with a predetermined magnitude of impedance for adjusting the electrical signals transmitted to the transmission antenna, at least one third coil with a predetermined magnitude of impedance used in adjusting a magnitude of impedance for grounding, and one feed point for transmitting the electrical signals received from the reception antenna to a receiver, and for transmitting electrical signals transmitted from a transmitter to the transmission antenna.

In accordance with another aspect of the present invention, an antenna module is provided comprising a first and a second reception antenna for converting electromagnetic waves to electrical signals; a transmission antenna for converting electrical signals to electromagnetic waves, a first and a second coil with a predetermined magnitude of impedance for adjusting the electrical signals received through the first and the second reception antenna, a third and a fourth coil with a predetermined magnitude of impedance for adjusting the electrical signals transmitted to the transmission antenna, a fifth coil with a predetermined magnitude of impedance used in adjusting a magnitude of impedance for grounding, and one feed point for transmitting the electrical signals received from the first and the second reception antenna to a receiver, and for transmitting electrical signals transmitted from a transmitter to the transmission antenna.

In accordance with yet another aspect of the present invention, an apparatus is provided for transmitting/receiving signals in a portable terminal, the apparatus comprising an antenna module mounted on the portable terminal, an RF unit including a receiver for receiving electrical signals received from the antenna module and a transmitter for transmitting electrical signals to the antenna module, and a controller for controlling a wireless communication function to be performed through the electrical signals transmitted from/received in the antenna module. The antenna module comprises at least one reception antenna for converting electromagnetic waves to electrical signals, at least one transmission antenna for converting electrical signals to electromagnetic waves, at least one first coil with a predetermined magnitude of impedance for adjusting the electrical signals received through the reception antenna, at least one second coil with a predetermined magnitude of impedance for adjusting the electrical signals transmitted to the transmission antenna, at least one third coil with a predetermined magnitude of impedance used in adjusting a magnitude of impedance for grounding, and one feed point for transmitting the electrical signals received from the reception antenna to a receiver, and for transmitting electrical signals transmitted from a transmitter to the transmission antenna.

BRIEF DESCRIPTION OF THE DRAWINGS

The above and other objects, features and advantages of the present invention will become more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
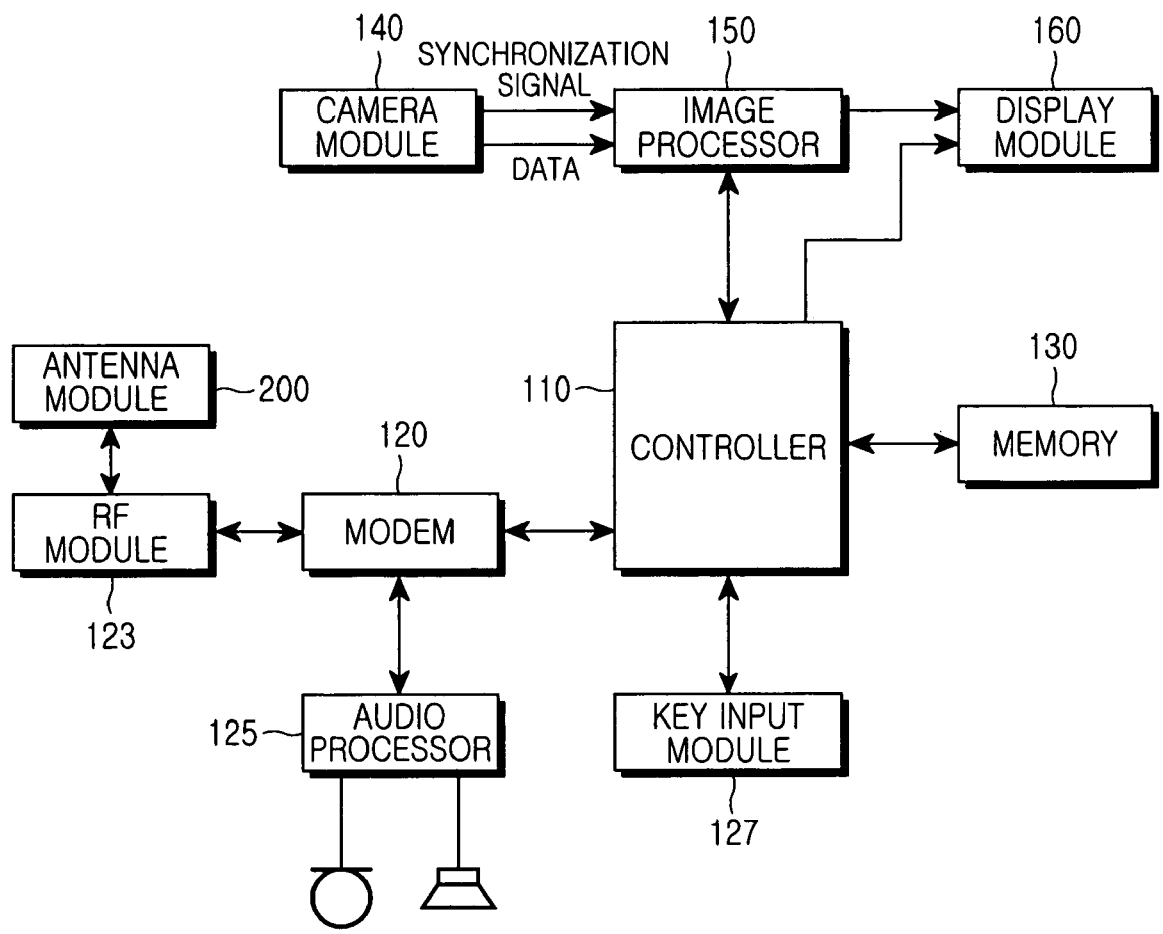
FIG. 1 is a block diagram showing the construction of a portable terminal including an antenna module according to an embodiment of the present invention.

Hereinafter, an exemplary embodiment of the present invention will be described with reference to the accompanying drawings. The same reference numerals are used to designate the same elements as those shown in other drawings.

An exemplary antenna module according to an embodiment of the present invention will be described wherein the example antenna module includes one transmission antenna, two reception antennas, two transmission coils for adjusting impedance of a signal transmitted to the transmission antenna, two reception coils for adjusting impedance of a signal received from the reception antennas, and one coil which is grounded. It will be apparent to those skilled in the art that the present invention can be easily embodied in yet other embodiments wherein elements are further modified or reconfigured.

Figure 2:
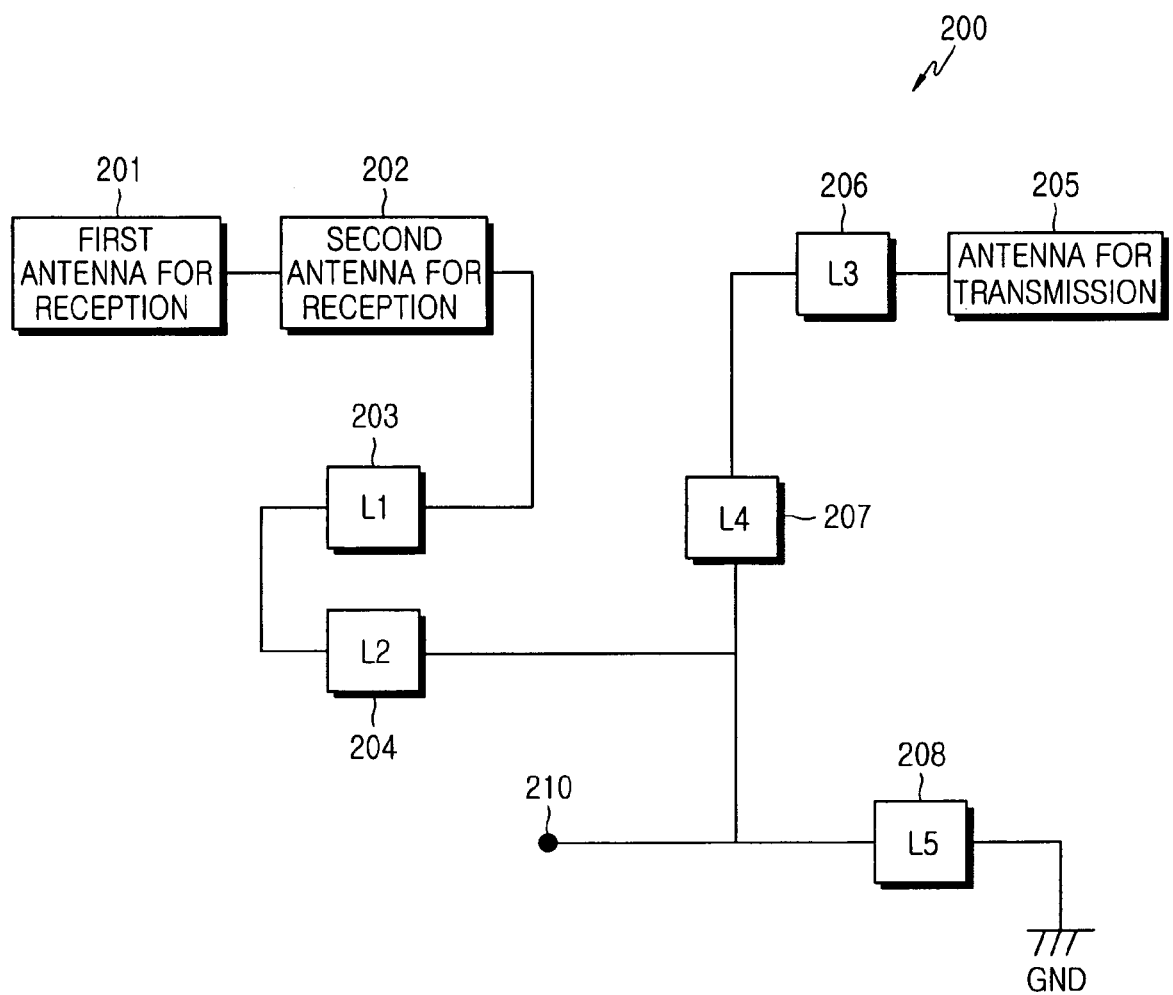
FIG. 2 is a block diagram showing the construction of the antenna module in FIG. 1 according to an embodiment of the present invention.

FIG. 1 is a block diagram showing the construction of a portable terminal including an antenna module according to an embodiment of the present invention, and FIG. 2 is a block diagram showing the construction of the antenna module according to an embodiment of the present invention.

The antenna module 200 mounted on the portable terminal is an apparatus for performing a function of converting electrical signals to electromagnetic waves and vice versa.

Hereinafter, the antenna module 200 will be described in detail with reference to FIG. 2, followed by a description of the portable terminal depicted in FIG. 1. The antenna module 200 includes a first reception antenna 201, a second reception antenna 202, an transmission antenna 205, a first coil 203, a second coil 204, a third coil 206, a fourth coil 207, a fifth coil 208, a ground GND and a single feed point 210.

The first reception antenna 201 and the second reception antenna 202 are internal-type antennas and can receive electromagnetic waves from a public network (e.g., base station). The antennas 201 and 202 receive only signals in a reception frequency band. The first reception antenna 201 and the second reception antenna 202, which are internal-type antennas, may include ceramic chip antennas. The antennas 201 and 202 are coupled together in series in the exemplary embodiment of the present invention shown in FIG. 2, which is further provided to adjust resonance between antennas. However, in yet other embodiments of the present invention, the antennas 201 and 202 can be coupled together in parallel.

The first coil 203 and the second coil 204 function as reception coils with a predetermined magnitude of impedance, which adjust reception signals from the first antenna 201 and the second antenna 202, and then transmit the signals to the single feed point 210. The third coil 206 and the fourth coil 207 function as transmission coils with a predetermined magnitude of impedance, which adjust transmission signals from the single feed point 210 connected to a transmitter and then transport the transmission signals to the transmission antenna 205. The transmission antenna 205 is an internal-type antenna and converts the transmission signals, which are electrical signals, to electromagnetic waves. The antenna 205 can then send the electromagnetic waves to the public network (e.g., base station). Further, the transmission antenna 205 may include a ceramic chip antenna. The fifth coil 208 with a predetermined magnitude of impedance is used in adjusting a magnitude of impedance for grounding.

Returning to FIG. 1, an RF module 123 performs a wireless communication function of the portable terminal. The RF module 123 comprises an RF transmitter (not shown) for up-converting and amplifying the frequency of a transmitted signal, an RF receiver (not shown) for low-noise amplifying a received signal and down-converting the frequency of the received signal, and so forth. Further, the RF module 123 is connected to the single feed point 210 of the antenna module 200 according to an embodiment of the present invention, and transmits a reception signal from the single feed point 210 to the RF receiver. Furthermore, the RF module 123 transmits the transmission signal from the RF transmitter to the single feed point 210 according to an embodiment of the present invention.

A modem 120 includes a transmitter for encoding and modulating the transmitted signal, a receiver for demodulating and decoding the received signal, and so forth. An audio processor 125 may include a codec (not shown). The codec preferably comprises a data codec for processing packet data and the like, and an audio codec for processing audio signals such as voice. The audio processor 125 performs a function of converting the digital audio signals received in the modem 120 into analog signals through the audio codec for reproduction of the digital audio signals, or converting transmission analog audio signals generated from a microphone into digital audio signals through the audio codec and transmitting the digital audio signals to the modem 120. The codec may be provided separately or may be included in a controller 110.

A memory 130 may include a program memory and a data memory. The program memory may store programs for controlling the general operations of the portable terminal. Further, the data memory performs a function of temporarily storing data generated while the programs are executed.

The controller 110 performs a function of controlling the general operations of the portable terminal. Further, the controller 110 may include the modem 120 and the codec. Further, the controller 110 controls wireless communication functions to be performed through the antenna module 200 according to the embodiment of the present invention.

A camera module 140 comprises a camera sensor (not shown) for photographing image data and converting the photographed optical signals into electric signals, and a signal processing unit (not shown) for converting analog image signals photographed by the camera sensor into digital data. In the exemplary embodiment shown, the camera sensor may be a charge-coupled device (CCD) sensor and the signal processing unit may be a digital signal processor (DSP). Further, the camera sensor may be integrated with the signal processing unit, or the camera sensor may be constructed separately from the signal processing unit.

An image processor 150 performs a function of generating screen data for displaying the image signals output from the camera module 140. The image processor 150 processes the image signals output from the camera module 140 by the frame, and outputs frame image data in accordance with the characteristics and the size of a display module 160. Further, the image processor 150 comprises an image codec (not shown) and performs a function of compressing the frame image data displayed on the display module 160 according to a predetermined scheme, or performs a function of restoring the compressed frame image data into the original frame image data. Herein, the image codec may include a joint photographic expert group (JPEG) codec, a moving picture expert group 4 (MPEG4) codec, Wavelet codec, or the like. Further, it is assumed that the image processor 150 includes an On Screen Display ('OSD') function, and the image processor 150 may output OSD data according to the size of a screen displayed under the control of the controller 110.

The display module 160 displays the image signals output from the image processor 150 on the screen and displays user data output from the controller 110. Herein, the display module 160 may use an LCD. In such a case, the display module 160 may comprise an LCD controller, a memory capable of storing image data, an LCD display device, and the like. Herein, when the LCD has a touch screen function, the display module 160 may further operate as an input module. A key input module 127 includes keys for inputting numerals and text information and function keys for setting various functions.

Hereinafter, the operation of the portable terminal including the antenna module 200 according to an embodiment of the present invention will be described with reference to FIGS. 1 and 2. When a user performs a dialing operation through the key input module 127 in a calling mode, the controller 110 detects the dialing operation, processes dial information received through the modem 120, and outputs the processed dial information to the antenna module 200 through the RF module 123. In the antenna module 200, the transmission signals input from the RF module 123 are adjusted with a predetermined magnitude of impedance of the third coil 206 and the fourth coil 207, and are then converted to electromagnetic waves through the transmission antenna 205 to be sent to the public network (e.g., base station).

When the called subscriber generates a response signal, the first reception antenna 201 and the second reception antenna 202 in the antenna module 200 convert the received electromagnetic waves to electrical signals. The first coil 203 and the second coil 204 then adjust the reception signals from the first reception antenna 201 and the second reception antenna 202 with a predetermined magnitude of impedance, and output the reception signals to the RF module 123 and the modem 120 via feed point 210. The controller 110 detects the input of the reception signals through the RF module 123 and the modem 120, forms a voice communication path including the audio processor 125, and performs a communication function.

Further, in a receiving mode, the first reception antenna 201 and the second reception antenna 202 of the antenna module 200 convert received electromagnetic waves to electrical signals, adjust the reception signals from the first reception antenna 201 with a predetermined magnitude of impedance of the first coil 203 and the second coil 204, and then output the reception signals to the RF module 123 and the modem 120. The controller 110 detects the input of the reception signals through the RF module 123 and the modem 120, determines that the portable terminal is in the receiving mode, and generates ring signals through the audio processor 125. Then, when a user responds, the controller 110 detects the response of the user, also forms a voice communication path including the audio processor 125, and performs a communication function. In the calling mode and the receiving mode, the voice communication is described as an example. However, in addition to the voice communication, a data communication function for communicating packet data and image data may also be performed.

Figure 3A:
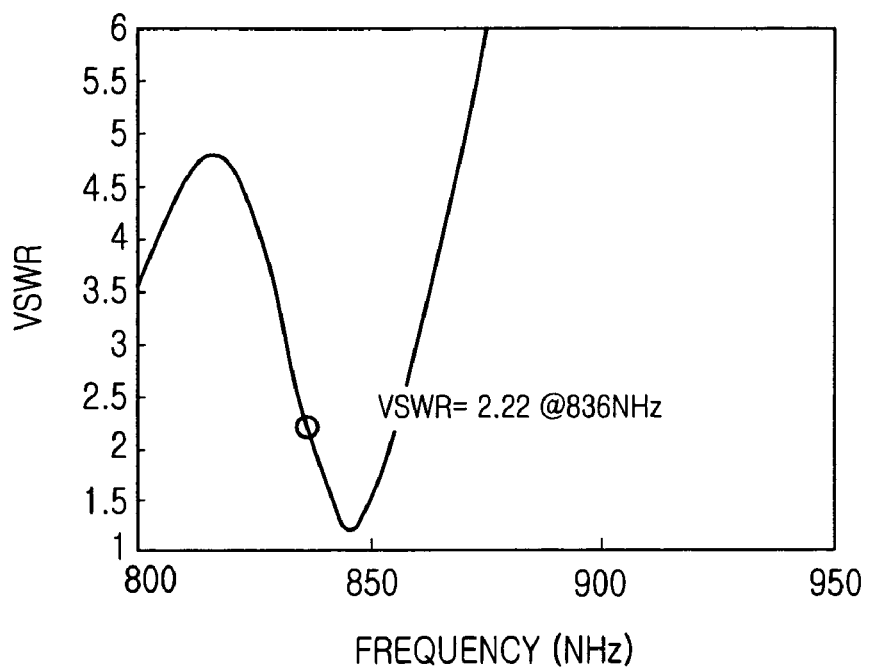
FIG. 3A is a graph showing the bandwidth of a separate transmission/reception antenna having two feed points according to the prior art.
Figure 3B:
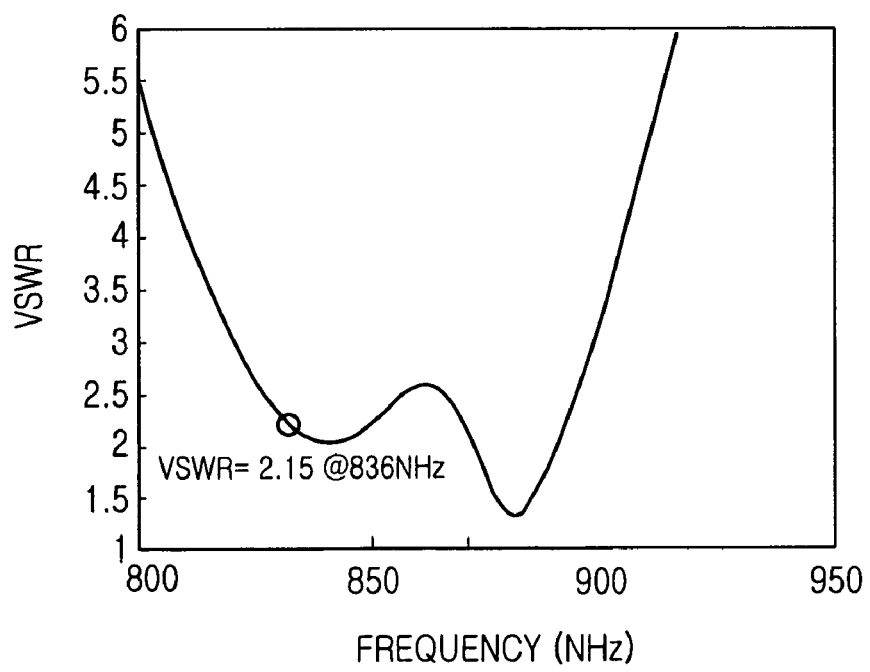
FIG. 3B is a graph showing the bandwidth of a separated transmission antenna/reception antenna having one feed point according to an embodiment of the present invention.

FIG. 3A is a graph showing the frequency bandwidth of the separate transmission/reception antenna having two feed points according to the prior art and FIG. 3B is a graph showing the frequency bandwidth of the antenna module having one feed point and a separate transmission/reception antenna according to an embodiment of the present invention. Comparing FIG. 3A and FIG. 3B, it is shown that the antenna module having one feed point and a separate transmission/reception antenna according to an embodiment of the present invention has a frequency bandwidth that is wider than that of the separate transmission/reception antenna having two feed points according to the prior art.

As described above, the present invention provides an antenna module in which the transmission antenna and the reception antenna are separated from each other but only one feed point is formed. Therefore, a wider bandwidth can be provided as compared to the conventional antenna in which the transmission antenna and the reception antenna are separated from each other and two feed points are formed. Furthermore, according to the present invention as described above, a transmission antenna and a reception antenna are incorporated into a single module, so that the single module can be installed simply and conveniently.

Although exemplary embodiments of the present invention have been described above for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An antenna module comprising:
   at least a first antenna for transmitting signals, and at least a second antenna for receiving signals;
   at least two coils for adjusting an impedance of signals transmitted from the first antenna, and at least two coils for adjusting an impedance of signals received in the second antenna;
   an impedance for grounding; and
   one feed point for transmitting the signals transmitted from or received in the first and second antennas, respectively, to a transceiver.

2. The antenna module in claim 1, wherein at least one of the first antenna and the second antenna is an internal-type antenna.

3. An antenna module comprising:
   at least one reception antenna for converting electromagnetic waves to electrical signals;
   at least one transmission antenna for converting electrical signals to electromagnetic waves;
   at least one first coil with a predetermined magnitude of impedance for adjusting the electrical signals received through the reception antenna;

at least one second coil with a predetermined magnitude of impedance for adjusting the electrical signals transmitted to the transmission antenna;

at least one third coil with a predetermined magnitude of impedance for adjusting a magnitude of impedance for grounding; and one feed point for transmitting the electrical signals received from the reception antenna to a receiver, and for transmitting electrical signals transmitted from a transmitter to the transmission antenna.

4. The antenna module in claim 3, wherein at least one of the transmission antenna and the reception antenna is an internal-type antenna.

5. An antenna module comprising:

a first and a second reception antenna for converting electromagnetic waves to electrical signals;

a transmission antenna for converting electrical signals to electromagnetic waves;

a first and a second coil with a predetermined magnitude of impedance for adjusting the electrical signals received through the first and the second reception antenna;

a third and a fourth coil with a predetermined magnitude of impedance for adjusting the electrical signals transmitted to the transmission antenna;

a fifth coil with a predetermined magnitude of impedance for adjusting a magnitude of impedance for grounding; and one feed point for transmitting the electrical signals received from the first and the second reception antenna to a receiver, and for transmitting electrical signals transmitted from a transmitter to the transmission antenna.

6. The antenna module in claim 5, wherein at least one of the first and second reception antenna and the transmission antenna is an internal-type antenna.

7. An apparatus for transmitting/receiving signals in a portable terminal, the apparatus comprising an antenna module mounted on the portable terminal, an RF unit including a receiver for receiving electrical signals received from the antenna module and a transmitter for transmitting electrical signals to the antenna module, and a controller for controlling a wireless communication function to be performed through the electrical signals transmitted from/received in the antenna module, wherein the antenna module comprises:

at least one reception antenna for converting electromagnetic waves to electrical signals;

at least one transmission antenna for converting electrical signals to electromagnetic waves;

at least one first coil with a predetermined magnitude of impedance for adjusting the electrical signals received through the reception antenna;

at least one second coil with a predetermined magnitude of impedance for adjusting the electrical signals transmitted to the transmission antenna;

at least one third coil with a predetermined magnitude of impedance for adjusting a magnitude of impedance for grounding; and one feed point for transmitting the electrical signals received from the reception antenna to a receiver, and for transmitting electrical signals transmitted from a transmitter to the transmission antenna.

8. The antenna module in claim 7, wherein at least one of the reception antenna and the transmission antenna is an internal-type antenna.

* * * * *